United States Patent
Chu et al.

(10) Patent No.: US 7,069,465 B2
(45) Date of Patent: Jun. 27, 2006

(54) METHOD AND APPARATUS FOR RELIABLE FAILOVER INVOLVING INCOMPLETE RAID DISK WRITES IN A CLUSTERING SYSTEM

(75) Inventors: Davis Qi-Yu Chu, Newark, CA (US); Allen King, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 10/205,769

(22) Filed: Jul. 26, 2002

(65) Prior Publication Data

US 2004/0019821 A1    Jan. 29, 2004

(51) Int. Cl.
*G06F 11/00* (2006.01)

(52) U.S. Cl. .......................................................... 714/6
(58) Field of Classification Search .................... 714/6; 711/4, 206
See application file for complete search history.

(56) References Cited

U.S. PATENT DOCUMENTS

| | | | | |
|---|---|---|---|---|
| 5,269,019 A | * | 12/1993 | Peterson et al. ............ | 707/205 |
| 5,301,297 A | | 4/1994 | Menon et al. ............... | 395/425 |
| 5,432,922 A | | 7/1995 | Polyzois et al. ............ | 395/425 |
| 5,488,731 A | | 1/1996 | Mendelsohn ................ | 395/800 |
| 5,551,003 A | | 8/1996 | Mattson et al. .............. | 395/463 |
| 5,680,570 A | | 10/1997 | Rantala et al. ............... | 395/440 |
| 5,757,642 A | | 5/1998 | Jones .......................... | 364/134 |
| 5,778,411 A | | 7/1998 | DeMoss et al. ................ | 711/4 |
| 5,928,367 A | | 7/1999 | Nelson et al. ................. | 714/6 |
| 6,163,856 A | | 12/2000 | Dion et al. ..................... | 714/4 |
| 6,219,752 B1 | | 4/2001 | Sekido ........................ | 711/114 |
| 6,230,240 B1 | | 5/2001 | Shrader et al. ............. | 711/114 |
| 6,381,674 B1 | * | 4/2002 | DeKoning et al. .......... | 711/113 |
| 6,505,273 B1 | * | 1/2003 | Taroda et al. ............... | 711/112 |
| 6,519,677 B1 | * | 2/2003 | Fuente ........................ | 711/112 |
| 6,557,140 B1 | * | 4/2003 | Kakuta et al. ............... | 714/769 |
| 6,678,787 B1 | * | 1/2004 | Petruschka et al. ......... | 711/112 |
| 6,721,870 B1 | * | 4/2004 | Yochai et al. ............... | 711/204 |
| 6,766,430 B1 | * | 7/2004 | Arakawa et al. ............ | 711/165 |
| 6,772,303 B1 | * | 8/2004 | Crockett et al. ............ | 711/162 |
| 6,973,549 B1 | * | 12/2005 | Testardi ...................... | 711/150 |
| 2003/0191916 A1 | * | 10/2003 | McBrearty et al. ......... | 711/162 |

OTHER PUBLICATIONS

Hanly, Jeri R.; Koffman, Elliot B.; Horvath, Joan C., C Program Design for Engineers, 1995, Addison-Wesley Publishing Company, Inc., pp. 356-357.*

(Continued)

*Primary Examiner*—Scott Baderman
*Assistant Examiner*—Paul Contino
(74) *Attorney, Agent, or Firm*—Kunzler & Associates

(57) ABSTRACT

Disclosed is a system and a method for reliable failover involving incomplete redundant arrays of inexpensive disks (RAID) writes in clustering systems. The system comprises the restructuring of a mirror race table (MRT) and a storage location that may be a non-volatile random access memory (NVRAM) module in a shared disk enclosure to make the MRT accessible to all nodes in the system. In one embodiment, the NVRAM module comprises copies of MRTs from each node operating within the cluster system.

26 Claims, 12 Drawing Sheets

OTHER PUBLICATIONS

SCSI Accessed Fault-Tolerant Enclosures Interface Specification, Apr. 1997, nStor Corporation and Intel Corporation, p. 2.*

Mellish, Barry; Sedeora, Surjit; Smythe, Tom; Voci, Gea, ESS Solutions for Open Systems Storage: Compaq AlphaServer, HP, and SUN, Mar. 2001, International Business Machines Corporation, First Edition, pp. 3 and 114.*

Castets, Gustavo A.; Leplaideur, Daniel; Bras, Daniel Alcino; Galang, Jason, IBM Enterprise Storage Server, Sep. 2001, International Business Machines Corporation, Second Edition, pp. 29, 32, and 49.*

IBM Corp., Method for Background Parity Update in a Redundant Array of Inexpensive Disks (Raid), IBM Technical Disclosure Bulletin vol. 35 No. 5 p. 139-141.

IBM Corp., Hybrid Reducdancy Direct-Access Storage Device Array with Design Options, IBM Technical Disclosure Bulletin vol. 37 No. 02B p. 141-148.

IBM Corp., Method and means of ensuring data integrity with removable NVRAM Cache, Research Disclosure Mar. 2000.

IBM Corp., Non-volatile position verification for nulti-node networks, Research Disclosure Nov. 2000.

* cited by examiner

METHOD AND APPARATUS FOR RELIABLE FAILOVER INVOLVING INCOMPLETE RAID DISK WRITES IN A CLUSTERING SYSTEM

BACKGROUND OF THE INVENTION

1. The Field of the Invention

The invention relates to redundant arrays of independent disks (RAID) in client/server computing environments, and more specifically to systems and methods for reliable failover capabilities involving write operations of a failed node within a cluster.

2. The Relevant Art

In contemporary client/server computing environments, a cluster is a set of coupled, independent computer systems called nodes, which behave as a single system. A client interacts with a cluster as though it were a single server. The combined computing power and storage of a cluster make the cluster a valuable tool in many applications ranging from on-line business to scientific modeling. In many instances, the reliability of these systems is critical to the overall success of a business endeavor or scientific experiment.

The most vulnerable component of a computer system, including cluster systems, are the hard disk drives which contain essentially the only mechanical, moving parts in the otherwise electronic assembly. Data written to a single drive is only as reliable as that drive, and many drives eventually do fail. The data stored on these hard disk drives in many cases represent critical client information, investment information, academic information, or the like. In an age when information storage and access is becoming increasingly important to all enterprises, more reliable methods of data storage are needed.

One existing storage method is a redundant array of independent disks (RAID). RAID systems store and access multiple individual hard disk drives as if the array were a single, larger disk. Distributing data over these multiple disks reduces the risk of losing the data if one drive fails, and it also improves access time. RAID was developed for use in transaction or applications servers and large file servers. Currently, RAID is also utilized in desktop or workstation systems where high transfer rates are needed.

In a cluster environment, such as the one described above, RAID and similar shared disk arrays are implemented to provide a client with access to the computing power of the combined nodes together with the large storage capacity of the disk array. FIG. 1 shows a schematic representation of a cluster system 100 of the prior art. Shown therein are a node cluster system 102, a network hub 104, a cluster administrator 106, and a plurality of clients 108. The depicted node cluster system 102 is shown by way of example as a two node system comprising two nodes 110 which are typically computer systems or servers. Node cluster systems 102 may comprise any number of nodes 110, the quantity of which is defined by the storage and computing capacity required.

Depicted within each node 110 is a RAID controller 112, which will be discussed in greater detail below with respect to FIG. 2. Through the RAID controllers 112, the nodes 110 transfer data to a RAID array 114. The RAID controllers 112 communicate with the RAID array 114 through data channels 116. In the depicted embodiment, the data channels 116 connecting the RAID controllers 112 and the RAID array 114 are preferably small computer system interface (SCSI) channels.

The cluster system 102 connects to a Local Area Network (LAN) 120 or a private network cable or interconnect 118. Under the depicted embodiment, the cluster system 102, cluster administrator 106, and the plurality of clients 108 are connected by the network hub 104. The cluster administrator 106 preferably monitors and manages cluster operations. Occasionally, a RAID controller 112 in one of the nodes 110 fails, generally due to a component or power failure. When this occurs, non-cached write operations may be underway and incomplete. As a consequence, critical data may be lost.

Referring now to FIG. 2, current RAID controllers 112 generally consist of a microprocessor 202, a SCSI controller 204, a flash read-only memory (ROM) module 206, a dynamic random access memory (DRAM) module 208, and a non-volatile random access memory (NVRAM) module 210. Within the NVRAM module 210 resides a mirror race table (MRT) 214. The MRT 214 maintains the beginning logical block address of each group of data that is undergoing a write operation on RAID disks. The group of data may be striped across the disks or organized as smaller groups of data known as cache line groups, FIG. 3a illustrates one embodiment of an MRT 214 of the prior art. Shown therein are a valid flag bit 302, a logical block address 304, and a logical drive number 306. The MRT 214 maintains a list of incomplete write operations. When a write operation is completed, the write operation's MRT entry is cleared by the RAID controller 112. When a failure occurs, the RAID controller 112 performs a consistency check upon returning to functionality.

Occasionally, a RAID controller 112 may fail. In such a case, other functioning RAID controllers have no access to MRT 214 of the failing controller 112. The remaining RAID controllers 112 cannot identify or make consistent incomplete write operations of the failed controller 112. However, the remaining RAID controllers 112 can identify the logical drives of the RAID 114 pertained to the failed controller 112. A remaining controller 112 will initiate a background consistency check (BGCC) on those logical drives, each from the beginning to the end, and if necessary, a consistency restoration where data inconsistency due to an incomplete write is found.

With the logical drive sizes currently in use, a BGCC of said logical drives of the RAID array 114 may take several hours. During this period of time, read and write operations are allowed to occur in the foreground on those logical drives not completely checked yet involved in the BGCC of the RAID array 114. A data corruption problem may occur in the event that a physical drive of one of said logical drives of the RAID disk array 114 fails a read request that happens to be located in a yet-to-be made consistent cache line group. This data corruption failure is a result of a RAID controller 112 regenerating data from other physical drives of this logical drives without realizing the data was inconsistent to begin with. This problem is commonly known as a "write hole."

Thus, it can be seen from the above discussion that a need exists in the art for an improved reliable failover method and apparatus for resolving incomplete RAID disk writes after a disk failure.

OBJECTS AND BRIEF SUMMARY OF THE INVENTION

The apparatus and method of the present invention have been developed in response to the present state of the art, and in particular, in response to the problems and needs in the art that have not yet been fully solved by currently available apparatus and methods. Accordingly, it is an overall object of the present invention to provide an apparatus and method that overcomes many or all of the above-discussed shortcomings in the art.

To achieve the foregoing object, and in accordance with the invention as embodied and broadly described herein in the preferred embodiments, an improved reliable failover apparatus and method is provided.

These and other objects, features, and advantages of the present invention will become more fully apparent from the following description and appended claims, or may be learned by the practice of the invention as set forth hereinafter. In certain embodiments, the invention comprises a plurality of shared disks and a plurality of RAID controllers each configured to access the plurality of disks. In order to distribute and maintain the location of the beginning logical block addresses (LBA) of the data on the disks undergoing write operations, a mirror race table (MRT) is implemented along with a common MRT storage location accessible by each of the RAID controllers. The common MRT storage location also duplicates all MRTs located on each RAID controller.

Under a preferred embodiment of the present invention, the common MRT storage location comprises a non-volatile random access memory (NVRAM) module. This NVRAM module may be implemented within a shared disk enclosure. Alternatively, the NVRAM module may be located on each of the RAID controllers. In one embodiment, the shared disk enclosure comprises a SCSI accessed fault-tolerant enclosure (SAF-TE).

Preferably, on each RAID controller, the apparatus also comprises an MRT search module configured to search the MRT for the first free entry and an MRT entry module configured to create an entry in the MRT by entering the logical block address (LBA) of the first cache line group to be written to the plurality of shared disks. Also provided may be an MRT pointer module configured to save an MRT pointer for the entry, an MRT retrieve module configured to find and retrieve the MRT pointer for the entry, an MRT read module configured to locate the cache line group of data on disks for consistency restoration when necessary (after a node bootup or cluster failover), an MRT clear module configured to find and clear the entry from the MRT, and an MRT transfer module configured to transfer the MRT from the shared disk enclosure to at least one RAID controller.

A method of the present invention is provided for establishing a common MRT storage location accessible by each of the RAID controllers. In one embodiment, the method comprises accessing the MRT from the common storage location, updating the MRT, detecting a failure of at least one RAID controller, and reliably distributing the work load of the failed RAID controller.

In one embodiment, the method also comprises searching the MRT for the first free entry from the top of the table to the bottom; creating an entry in the MRT by entering the logical block address (LBA) of the first cache line group to be written to the plurality of shared disks; saving an MRT pointer for the entry; finding and retrieving the MRT pointer for the entry; and finding and clearing the entry from the MRT. In order to provide reliable failover capabilities, the method may also comprise transferring the MRT from the shared disk enclosure to at least one RAID controller.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is claimed and described herein in terms of "modules." As used herein, this term is used to refer to lines of software code instructions or to electronic hardware configured to achieve the given purpose of the module. As such, a module is a structural element. As will be readily understood to one skilled in the art of software development, more than one instruction may exist within a module. The instructions may not necessarily be located contiguously, and could be spread out among various different portions of one or more software programs, including within different objects, routines, functions, and the like. Similarly, the hardware components of a subsystem or module, such as integrated circuits, logic gates, discrete devices, and the like, need not be organized into a single circuit, but could be distributed among one or more circuits. Unless stated otherwise, hardware or software implementations may be used interchangeably to achieve the structure and function of the disclosed modules.

Figure 3A:
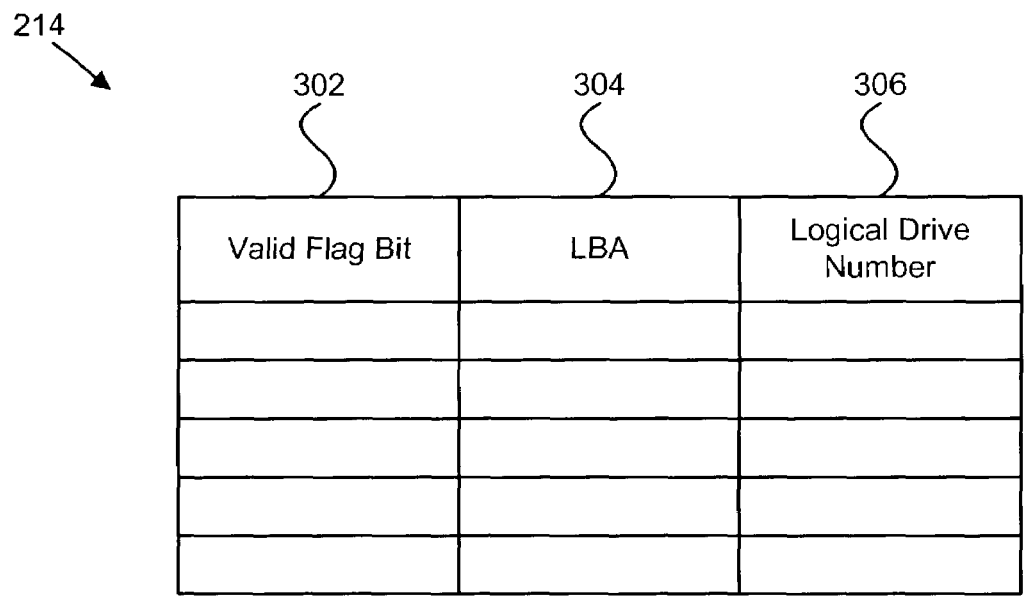
FIG. 3a is a schematic block diagram illustrating one embodiment of a mirror race table (MRT) of the prior art.
Figure 3B:
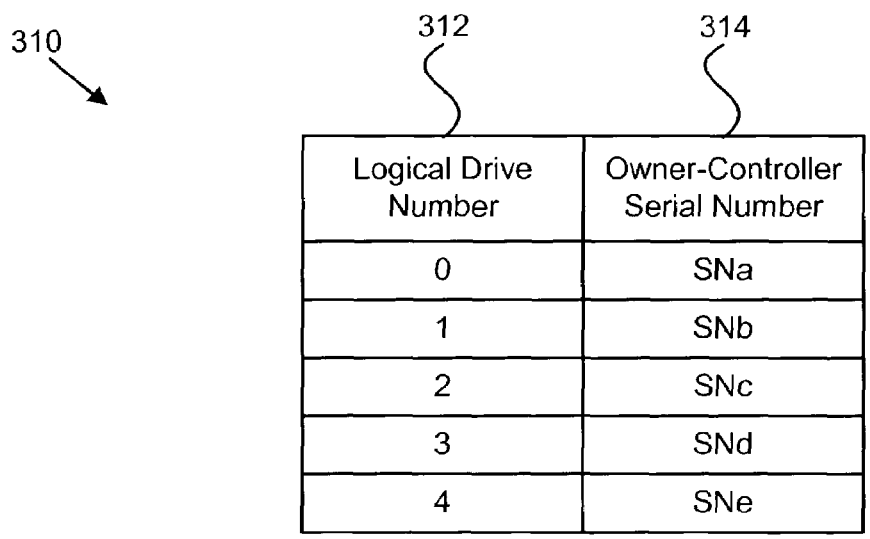
FIG. 3b is a schematic block diagram illustrating one embodiment of a drive ownership table (DOT) of the present invention.

FIG. 3b is a graphical representation of a drive ownership table 310. The drive ownership table 310 comprises a logical drive number column 312 and a corresponding ownercontroller serial number column 314. Using the drive ownership table 310, redundant array of independent disk (RAID) controllers 112 (of FIG. 1) are able to determine the ownership of each logical drive in the RAID array 114. The drive ownership table 310 is typically populated by the RAID controller 112 of each node 110. Each RAID controller 112 submits the assigned logical drive numbers of the RAID array 114 to a reserved area on the RAID array 114. The drive ownership table 310 is also loaded into the DRAM module 208 of the RAID controller 112.

Figure 4:
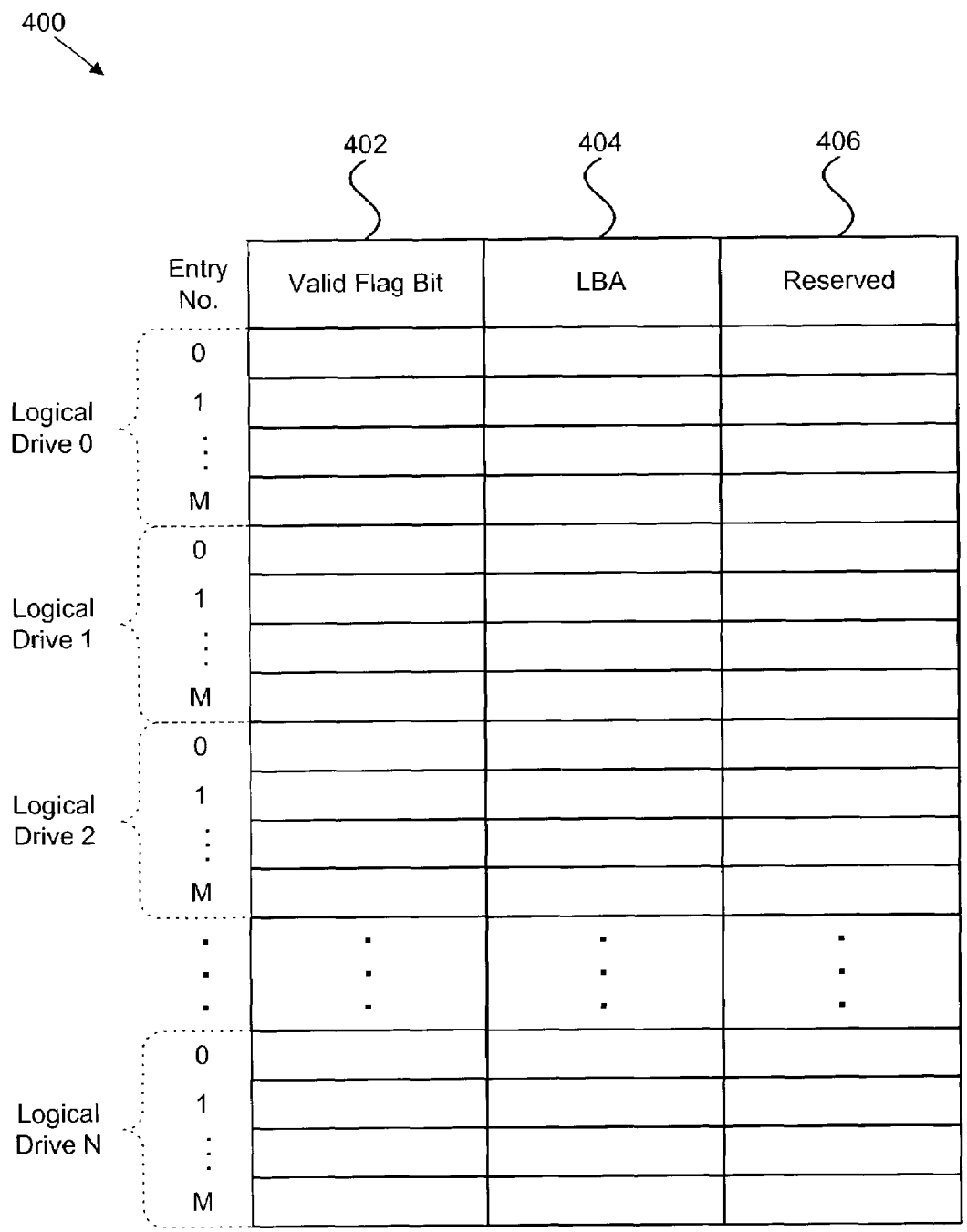
FIG. 4 is a schematic block diagram illustrating one embodiment of an MRT of the present invention.

Referring now to FIG. 4, shown therein is one embodiment of a mirror race table (MRT) 400 residing in the RAID controller 112 of the present invention. The MRT 400 comprises a valid flag bit column 402, a logical block address (LBA) column 404, and a reserved column 406. Under a preferred embodiment of the present invention, the MRT 400 is configured in a manner similar to the MRT 214 of FIG. 3a, but is restructured such that entries in the MRT 400 are directly indexed by increasing logical drive numbers. The restructured MRT 400 is configured to optimize access and updates.

Each entry in the MRT 400 comprises a valid flag bit 402, a LBA 404 that represents the beginning address of a cache line group, and a reserved field 406 that may be used for an optional check sum to validate entry information. In one embodiment, the MRT 400 requires only six bytes of storage space for each clustered controller's entry.

Figure 5:
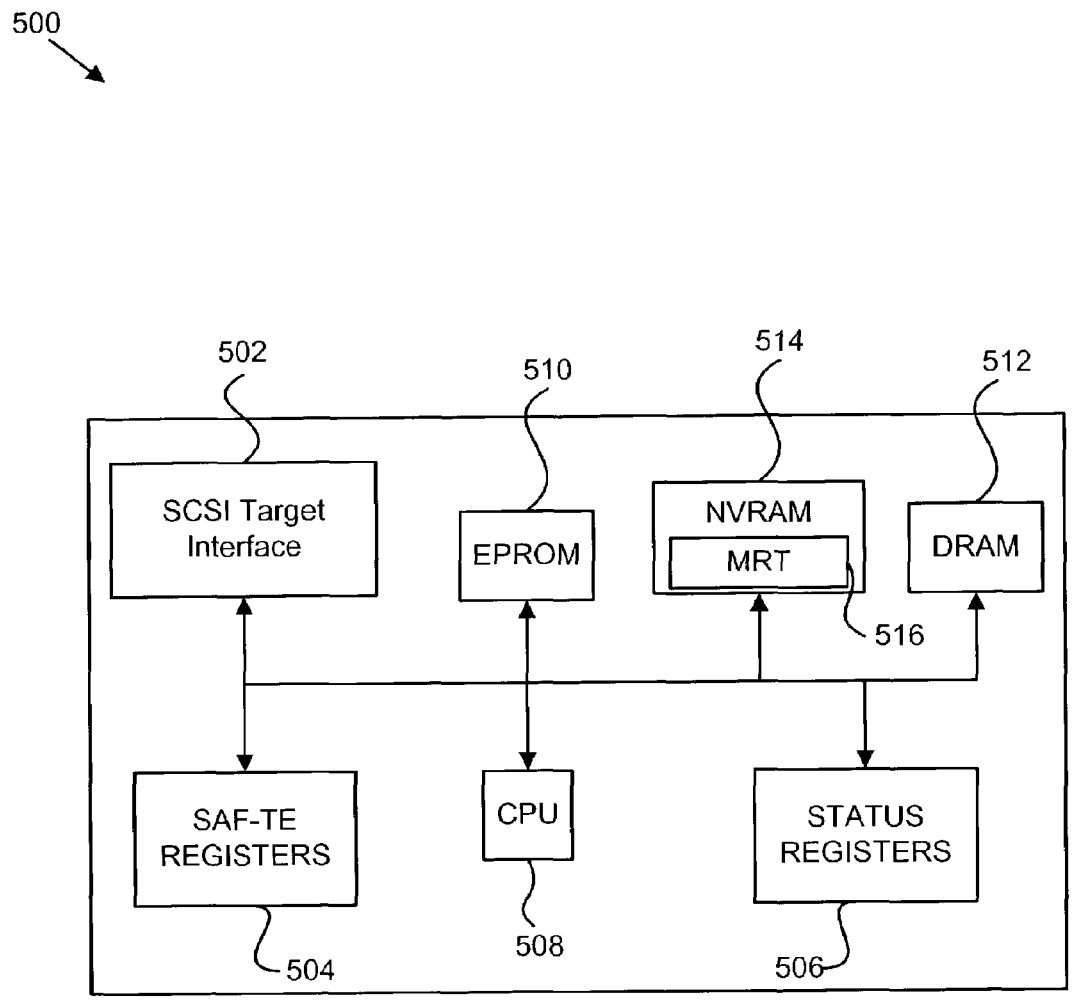
FIG. 5 is a schematic block diagram illustrating one embodiment of a SCSI accessed fault-tolerant enclosure (SAF-TE) electronic hardware of the present invention.

FIG. 5 illustrates schematically one embodiment of a type of intelligent disk enclosures known as a SCSI accessed fault-tolerant enclosure (SAF-TE) 500. A SAF-TE 500 is a structure for implementing SCSI based processor device, disk housing, power supplies and other components in order to communicate enclosure component status information to monitoring applications. In certain embodiments, a plurality of logical drives within the SAF-TE 500 may be partitioned from a single RAID array 114. These partitions of the RAID array 114 become virtual drives and are assigned to separate RAID controllers 112. Typically, the RAID array 114 is housed within an intelligent disk enclosure.

The SAF-TE 500 generally comprises a SCSI target interface 502, a plurality of SAF-TE registers 504, a plurality of status registers 506, a CPU 508, an erasable programmable read-only memory (EPROM) 510 module, and a dynamic random access memory (DRAM) module 512. In accordance with the present invention, a non-volatile random access memory (NVRAM) module 514 is also shown within the SAF-TE 500. A detailed description will not be made of each component of the SAF-TE 500, as one skilled in the art will readily recognize the function and purpose for the separate components. The configuration of the SAF-TE 500 is given herein by way of example and is not to be considered limiting, as one skilled in the art can readily modify the configuration while maintaining the intention of the enclosure.

In a multi-node cluster, when a node fails, an automatic failover occurs. The cluster software operating in functioning node(s) in response to a failure, disperses the work from the failed system to remaining systems in the cluster. However, prior to the invention, RAID controllers 112 at remaining nodes 110 have no access to the MRT 214 of the failed system. In order to overcome limitations in the art, an MRT 516 is provided within the NVRAM 514. The configuration of the MRT 516 will be described in greater detail below with reference to FIG. 6.

Figure 1:
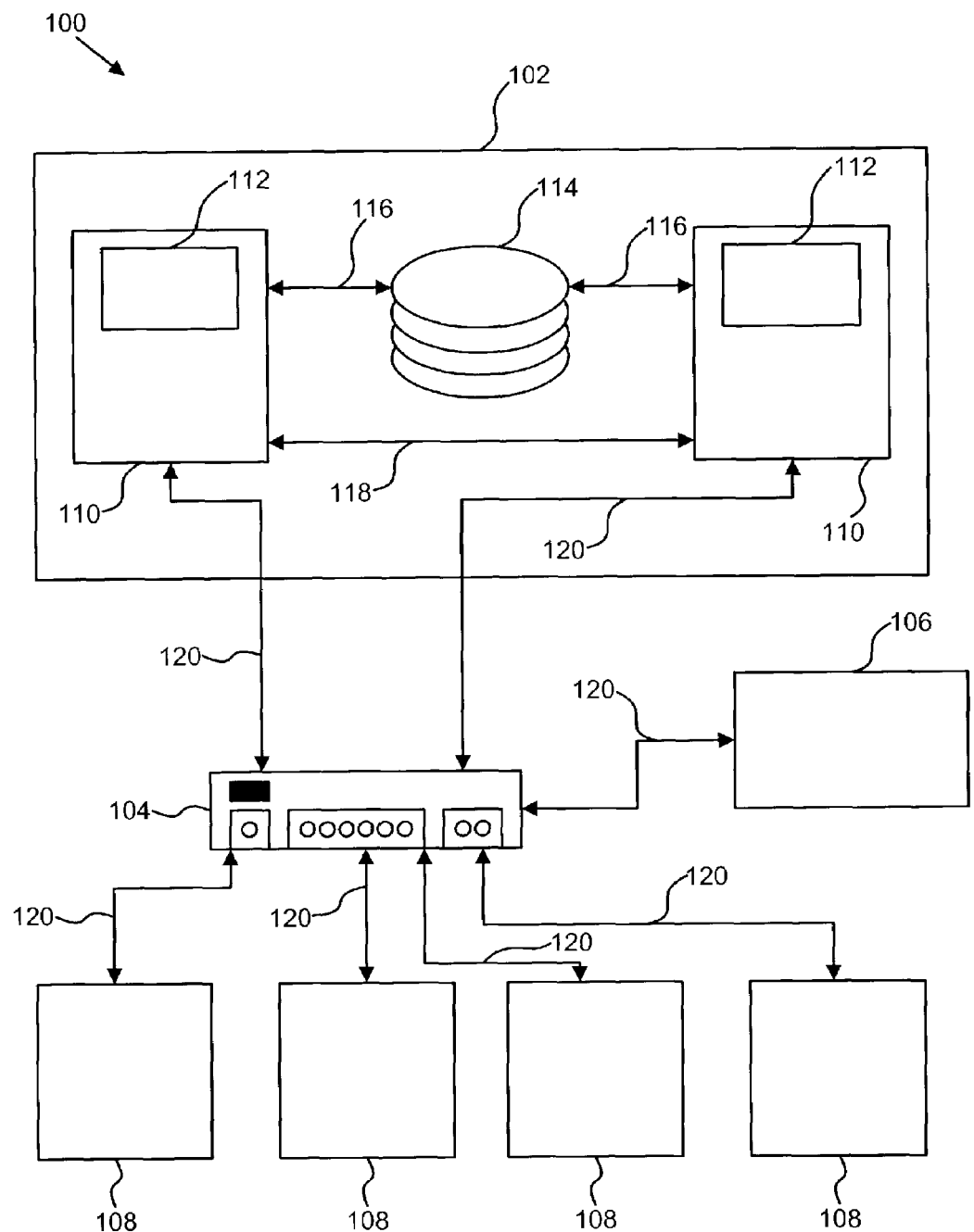
FIG. 1 is a schematic block diagram illustrating one embodiment of a node cluster system of the prior art.
Figure 2:
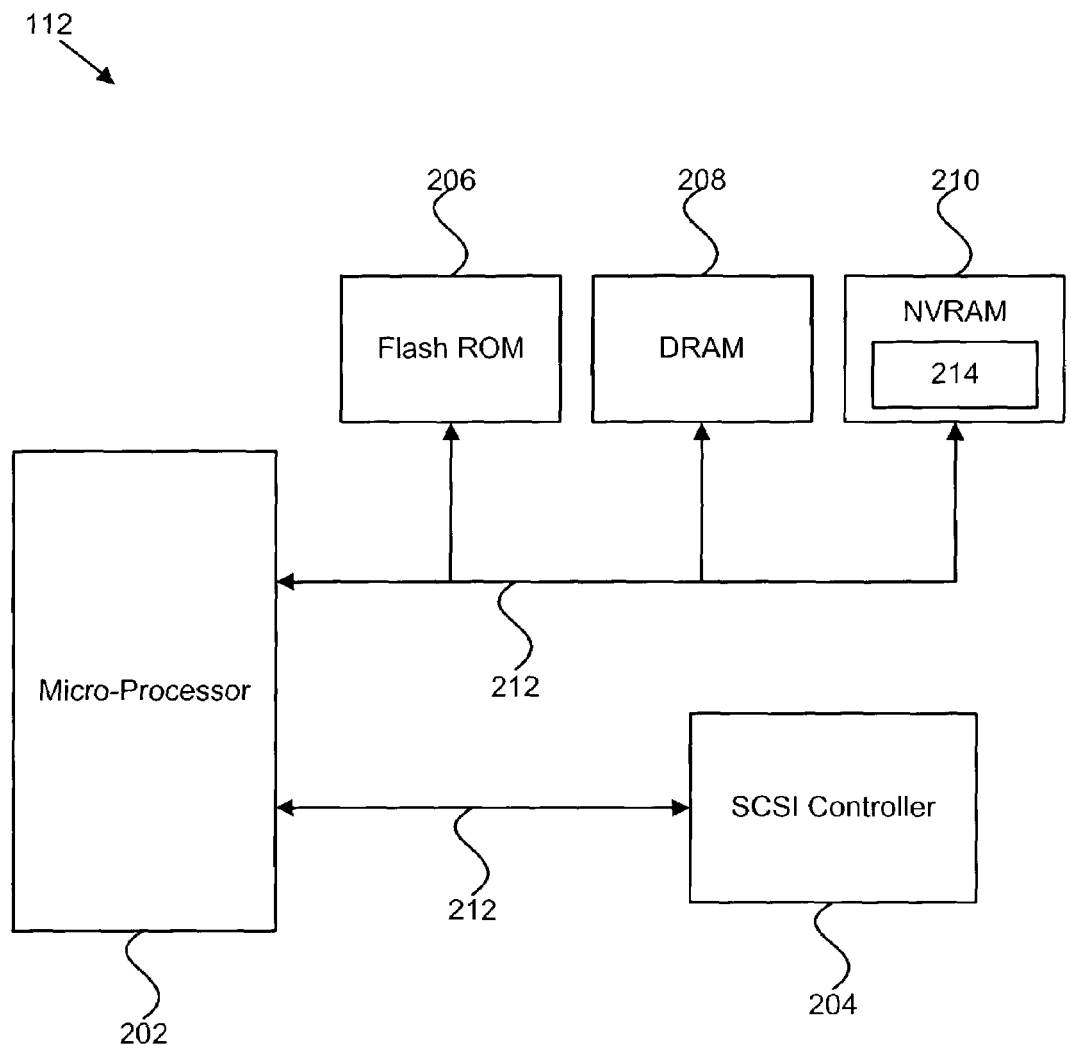
FIG. 2 is a schematic block diagram illustrating one embodiment of a controller for a redundant array of independent disks (RAID) of the prior art.

Under a preferred embodiment of the present invention, the MRT 516 resides within the NVRAM module 512 and is configured to be accessed by functioning RAID controllers 112 of FIG. 1. In one embodiment, the MRT 516 comprises exact copies of MRTs 400 that reside within multiple RAID controllers 112. Alternatively, the MRT 516 is configured to contain data regarding each RAID controller 112 operating within the cluster. For example, the MRT 516 may contain data such as the device type, vendor name, platform, firmware, and serial number. The inclusion of the NVRAM module 512 and the MRT 516 within the SAF-TE 500 is given herein by way of example, and the manner of its use with alternative shared disk enclosures should be readily apparent to those skilled in the art.

Figure 6:
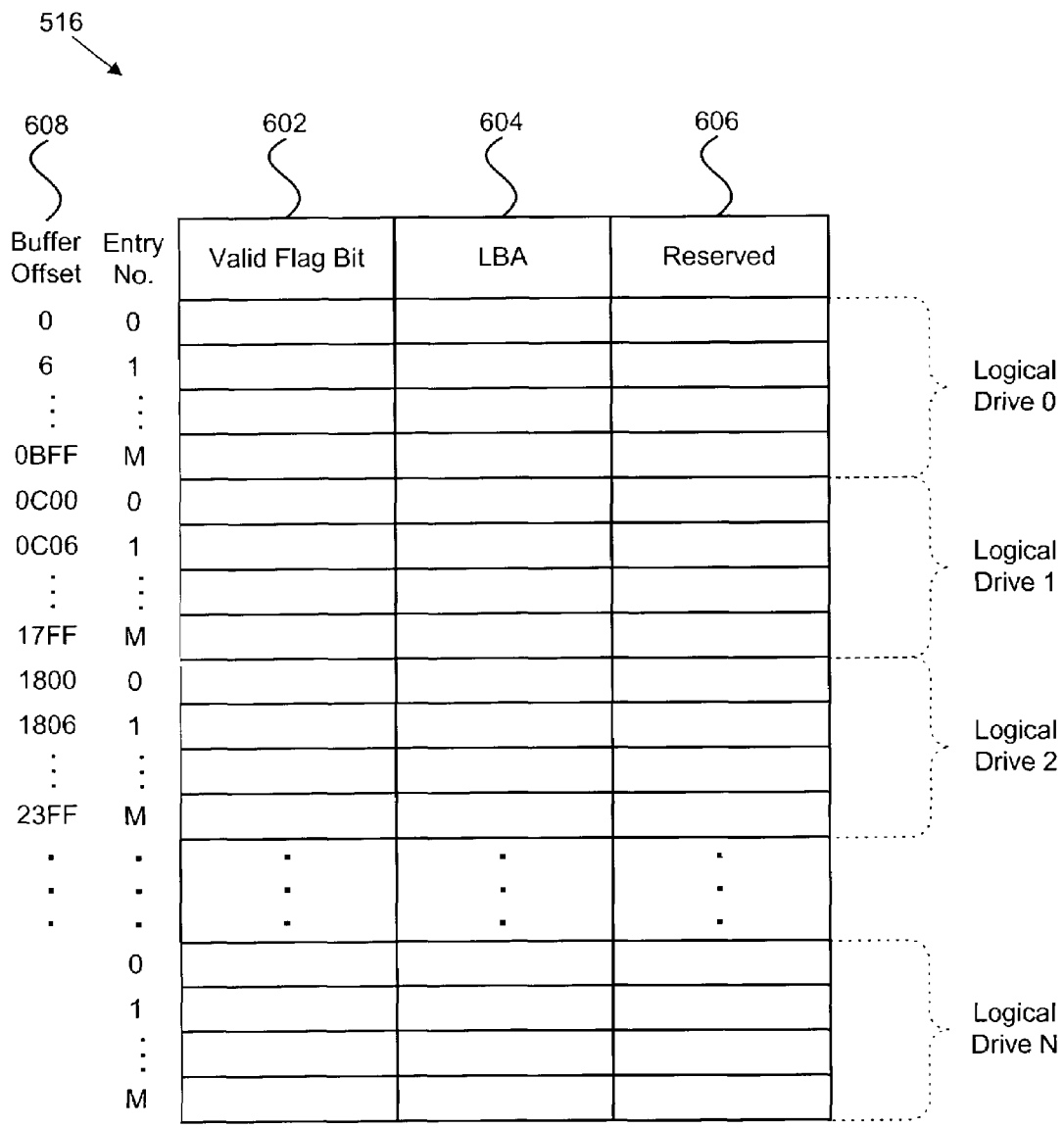
FIG. 6 is schematic block diagram illustrating a specific embodiment of an MRT of the present invention.

FIG. 6 illustrates a schematic representation of a specific example of an MRT 516 as implemented within a shared disk enclosure such as the SAF-TE 500. Under the embodiment of FIG. 6, the MRT 516 comprises a valid flag bit column 602, a logical block address (LBA) column 604, and a reserved column 606. Each entry in the MRT 516 preferably comprises a valid flag bit, a LBA that represents the beginning address of a cache line group, and a reserved field that may be used for an optional check sum to validate entry information. The buffer offset 608 comprises the starting byte offset and is contained within the transferred data buffer. An offset greater than or equal to the buffer capacity results in a check condition status with a sense key of illegal request code and an additional sense code of invalid field in CDB.

Figure 7:
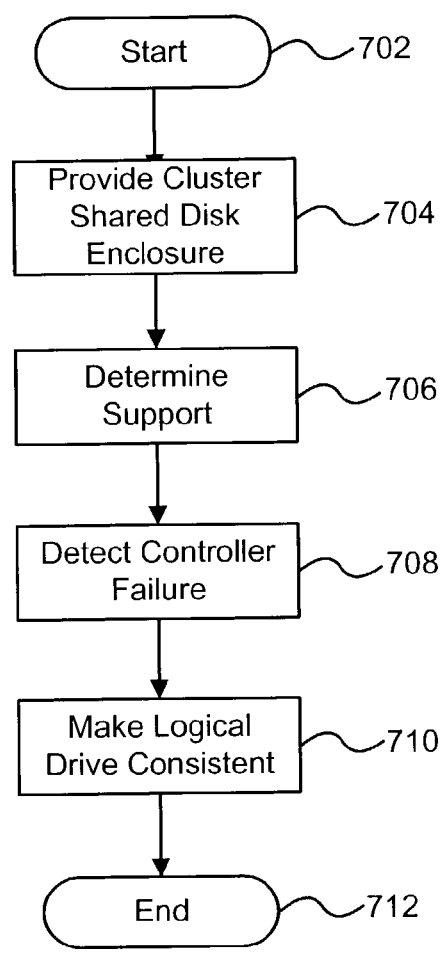
FIG. 7 is a flow chart illustrating a method for reliable failover of incomplete write operations in a clustering system of the present invention.

Referring now to FIG. 7, shown therein is a flow chart illustrating a method 700 for reliable failover of incomplete write operations in a clustering system of the present invention. The method starts 702 and a cluster shared disk enclosure is provided 704. In one embodiment, the cluster system comprises the system 100 of FIG. 1. Under the method 700, a RAID controller 112 determines 706 the support status of the shared disk enclosure. Under a preferred embodiment of the present invention, a flag bit is added to the inquiry data string in so doing. For example, bit 0 of byte 5 may indicate the support status of the shared disk enclosure for the added MRT 516 of the NVRAM module 514. In the event that a controller failure is detected 708, the logical drive pertaining to the failed RAID controller 112 is made consistent 710. The method of making 710 the logical drive consistent will be described below in greater detail with reference to FIGS. 8 and 9.

Figure 8:
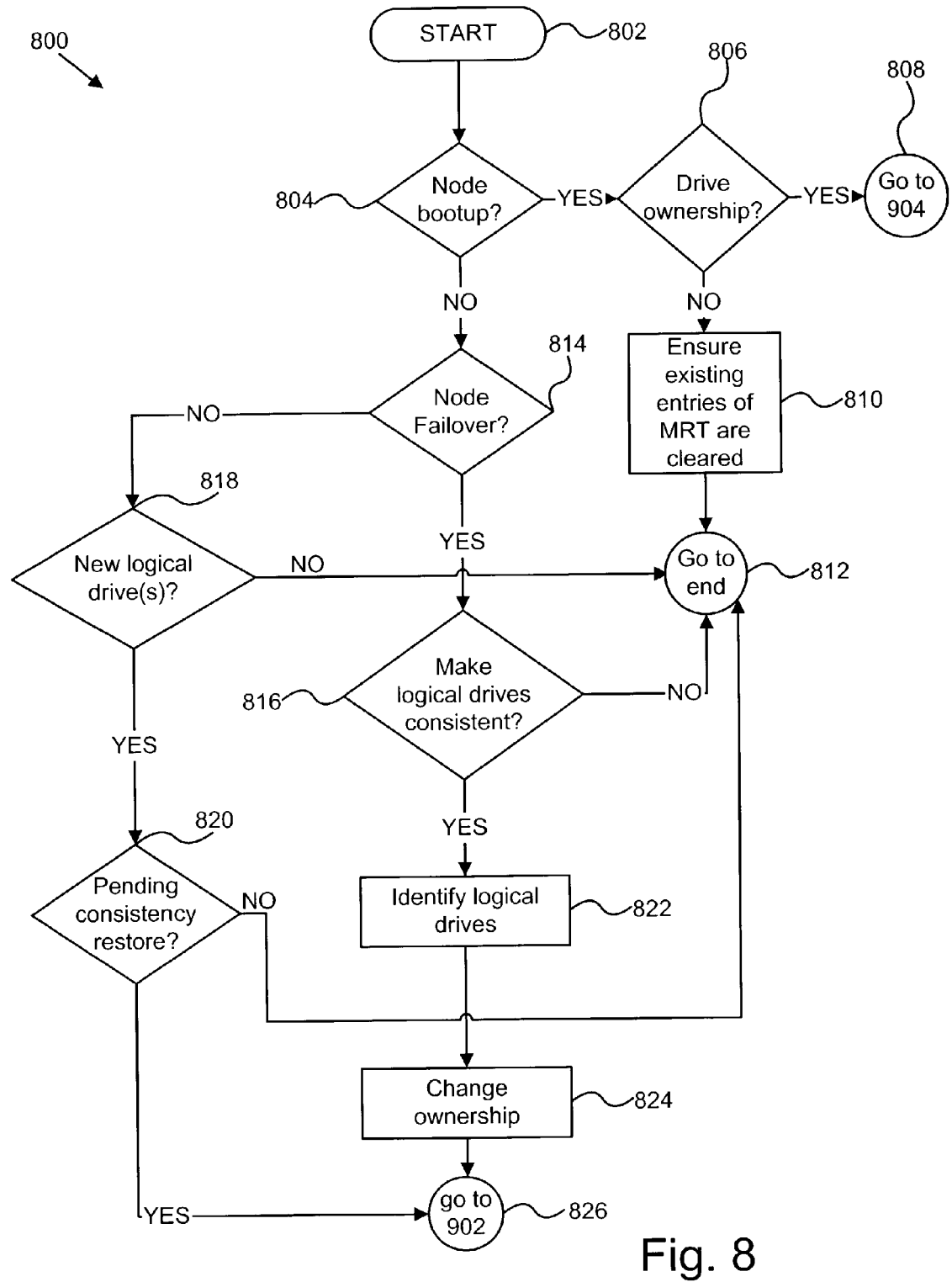
FIG. 8 is the first flow chart illustrating a method for making logical drives consistent by utilizing the MRT of the present invention.
Figure 9:
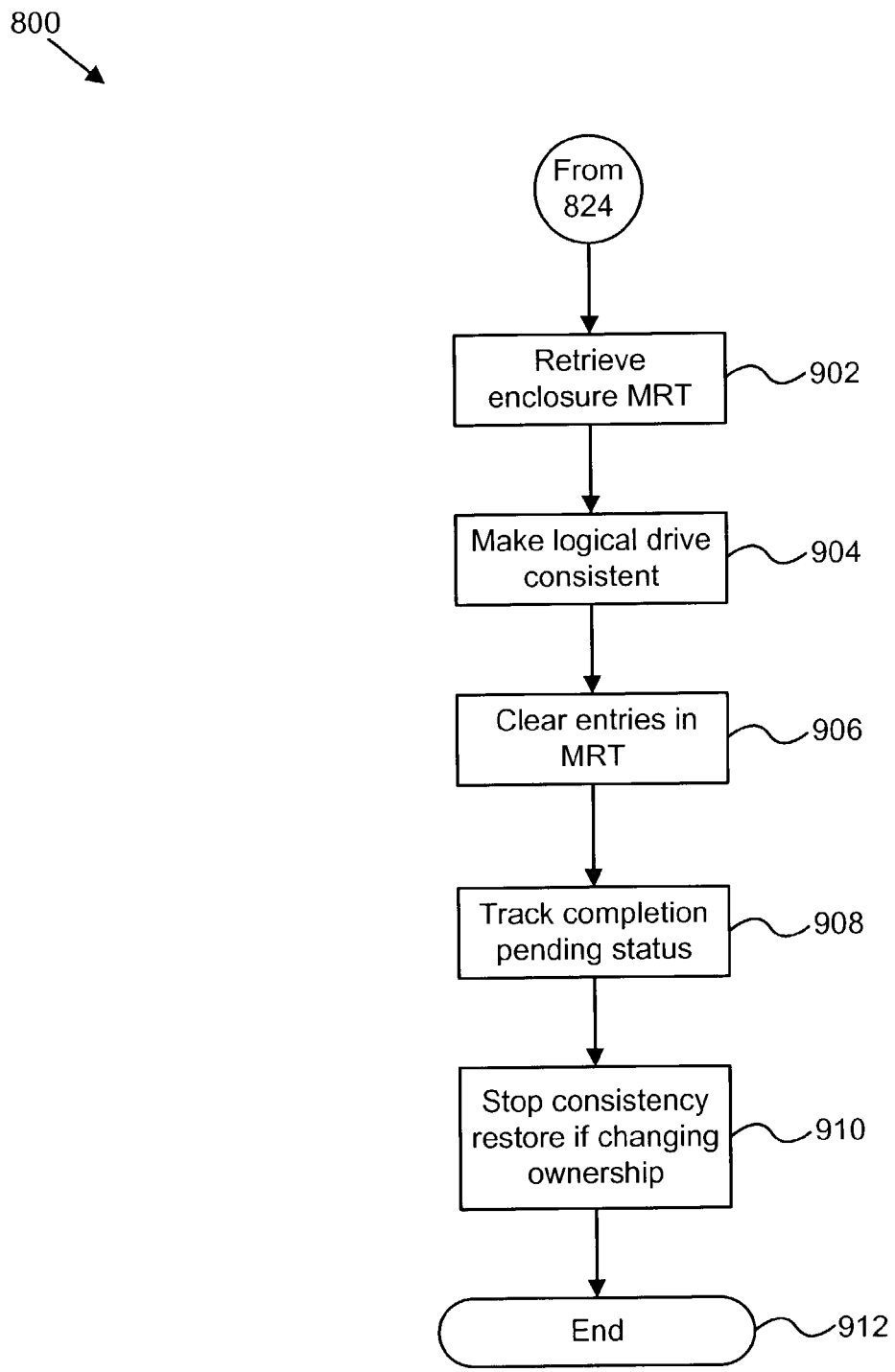
FIG. 9 is the second flow chart illustrating the method for making logical drives consistent by utilizing the MRT of the present invention.

FIGS. 8 and 9 illustrate a method 800 for making logical drives consistent by utilizing the MRT of the present invention. The method 800 corresponds in one embodiment to the step 710 of FIG. 7. The method 800 starts 802 and a node bootup 804 is detected. In one embodiment, a node bootup comprises a return to operation of a failed controller. If the node is determined 806 to have drive ownership, then the method branches to FIG. 9, where the logical drive is made consistent 904.

Under a preferred embodiment of the present invention, the logical drive is made consistent 904 by reading the data of the cache line groups, as found in the MRT of the node, and calculating the parity that is required to make the cache line group consistent. This calculated parity is compared against the recorded parity. If the calculated parity does not match the recorded parity then the newly calculated parity is recorded to the logical drive. Following the consistency check, the MRT entries in both the RAID controller 112 and the enclosure are cleared 906 to ensure that data in a potentially malfunctioning member disk can be correctly regenerated.

The completion pending status of consistency restorations is then tracked 908. The pending consistency restorations are stopped 910 if the logical drive ownership changed during node failure. The method 800 then ends 912. Referring again to FIG. 8, if the returning node is determined 806 to not have drive ownership, then all entries in the MRT of the node are cleared 810, at which point the method 800 ends 912.

In the absence of a node bootup 804, when a node failover 814 is detected, remaining nodes determine if logical drives must be made consistent 816. If a consistency restoration is necessary, the logical drives are identified 822. Under a preferred embodiment of the present invention, logical drive identification is determined by the drive ownership table 310. The ownership of the failed node is then changed 824, and the entries pertaining to the failed node are retrieved 902 from the MRT of the shared disk enclosure. The logical drive is then made consistent 904, as described above.

Following the consistency restoration, the MRT entries in both the RAID controller 112 and the enclosure are cleared 906 to ensure that data in a potentially malfunctioning member disk can be correctly regenerated. The method 800 continues, and the completion pending status of consistency restorations is tracked 908. The pending consistency restorations are stopped 910 if the logical drive ownership changed during node failure. The method 800 then ends 912. Alternatively, if a consistency restore of logical drives is determined 816 to not be necessary, the method 708 ends 912.

Returning to determination 814, if a node failover is not detected and new logical drives are assigned 818, the method determines whether there is any pending consistency restore activity for the assigned logical drives. If pending consistency restore operations exist 820, then the segments pertaining to the logical drives are retrieved 902 from the MRT of the shared disk enclosure. The logical drives are then made consistent 904, as described above. Following the consistency restoration, the entries in both the shared disk enclosure MRT and in the RAID controller MRT are cleared 906 to ensure that the data in a potentially malfunctioning member disk can be correctly regenerated.

The method 708 continues, and the completion pending status of consistency restorations is tracked 908. The pending consistency restorations are stopped 910 if the logical drive ownerships have changed. If there is no pending 820 consistency restoration, the method 708 ends 912. If no new logical drives are detected 818, the method 800 ends 912.

In one embodiment, the method 800 described above with reference to FIGS. 8 and 9 is configured to loop continuously. Alternatively, the method 800 may wait for the occurrence of a node bootup, a node failover, or new logical drives event to occur.

Figure 10:
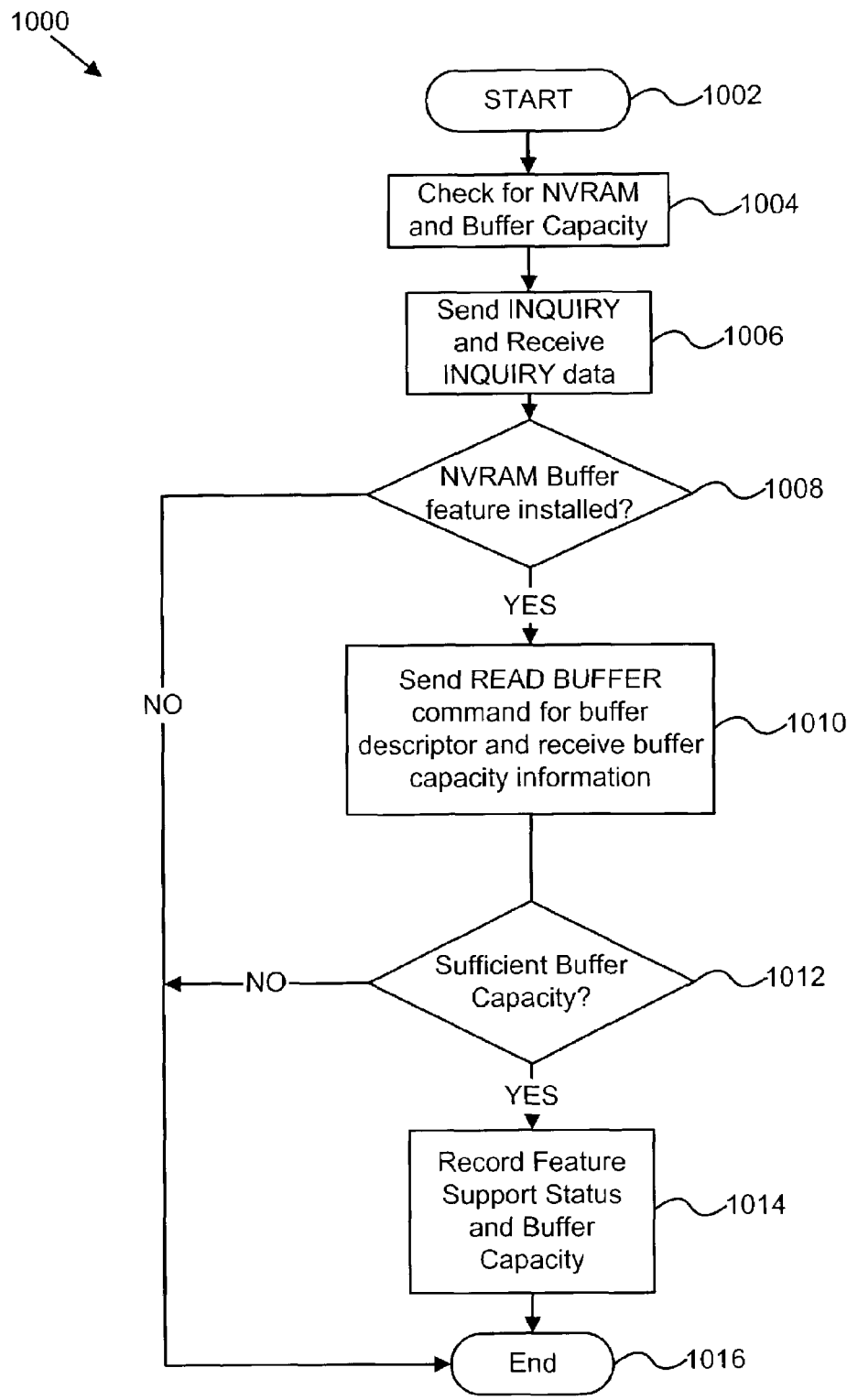
FIG. 10 is a flow chart illustrating a method for determining support status of SAF-TE enclosures of the present invention.

Referring now to FIG. 10, shown therein is a flow chart illustrating a method 1000 for determining support status of SAF-TE enclosures of the present invention. The method 1000 is one specific example of the implementation of the step of determining 706 support of FIG. 7. The method 1000 starts 1002 and a node checks 1004 for the presence of the added NVRAM module 514 of the present invention and for buffer capacity. The node controller sends 1006 an INQUIRY command and receives 1006 INQUIRY data. As described previously, in one embodiment the command data buffer may contain an added flag bit indicating the presence of the NVRAM module 514. If the NVRAM buffer feature is installed 1008, then a READ BUFFER command is sent 1010 for a buffer descriptor, and the buffer capacity information is received. The received buffer capacity information is used to determine whether there is 1012 sufficient buffer capacity.

Figure 11:
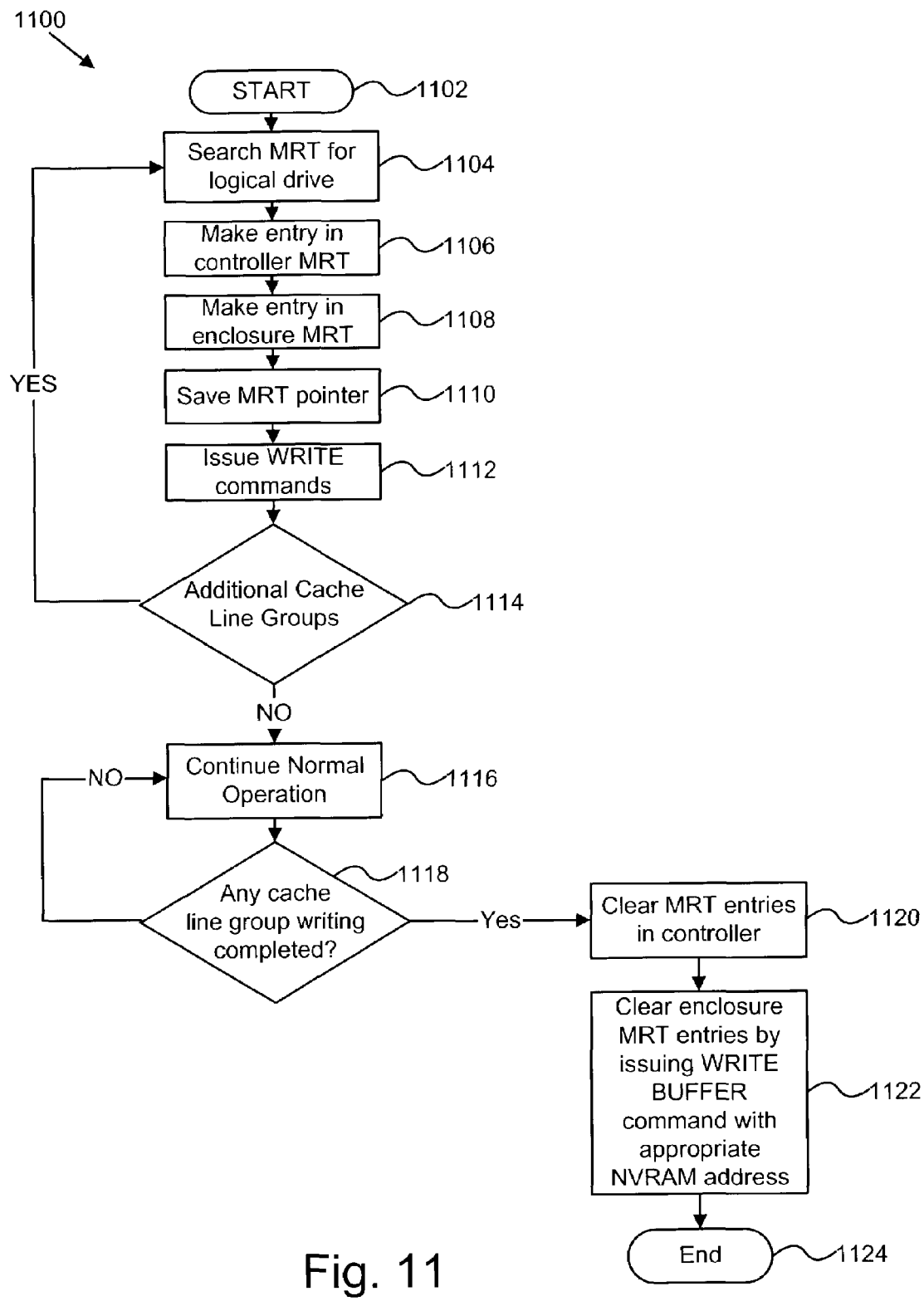
FIG. 11 is a flow chart illustrating a method for making and clearing entries in the MRT of the present invention.

Under a preferred embodiment of the present invention, if the buffer capacity is determined 1012 to be sufficient, then the feature support status and buffer capacity is recorded 1014. Alternatively, if the buffer capacity is determined 1012 to not be sufficient, or the NVRAM buffer feature is determined 1008 to not be installed, the node then operates in a manner as described with reference to the prior art FIG. 11 is a flow chart illustrating a method 1100 for making and clearing entries in the MRT of the present invention. The method 1100 illustrates one specific embodiment of the step of clearing 906 entries of FIG. 9. The method 1100 starts 1102 and the node controller MRT is searched 1104 for the first free entry. In one embodiment, an entry is made 1106 in the node controller MRT by entering the beginning logical block address of the first cache line group to be written. An equivalent entry is made 1108 in the shared disk enclosure MRT by issuing a WRITE BUFFER command with the appropriate NVRAM address. The MRT pointer to this entry is then saved 1110 in the memory of the node controller. Under a preferred embodiment of the present invention, WRITE commands are issued 1112 to the logical drives for entries in the MRT while additional cache line groups are found 1114 in the MRT.

When it is determined 1114 that no other cache line groups are present, typical cluster operations are continued 1116. Alternatively, when a cache line group writing is completed 1118, respective entries in the node controller are cleared 1120. The shared disk enclosure MRT is cleared 1122 by issuing WRITE BUFFER commands with the appropriate NVRAM addresses. Under an alternative embodiment, the node controller is interrupt driven rather than configured to wait for activity completion. In one embodiment, the WRITE BUFFER command to clear entries in the MRT comprises issuing a WRITE BUFFER command with write data containing all zeroes.

Figure 12:
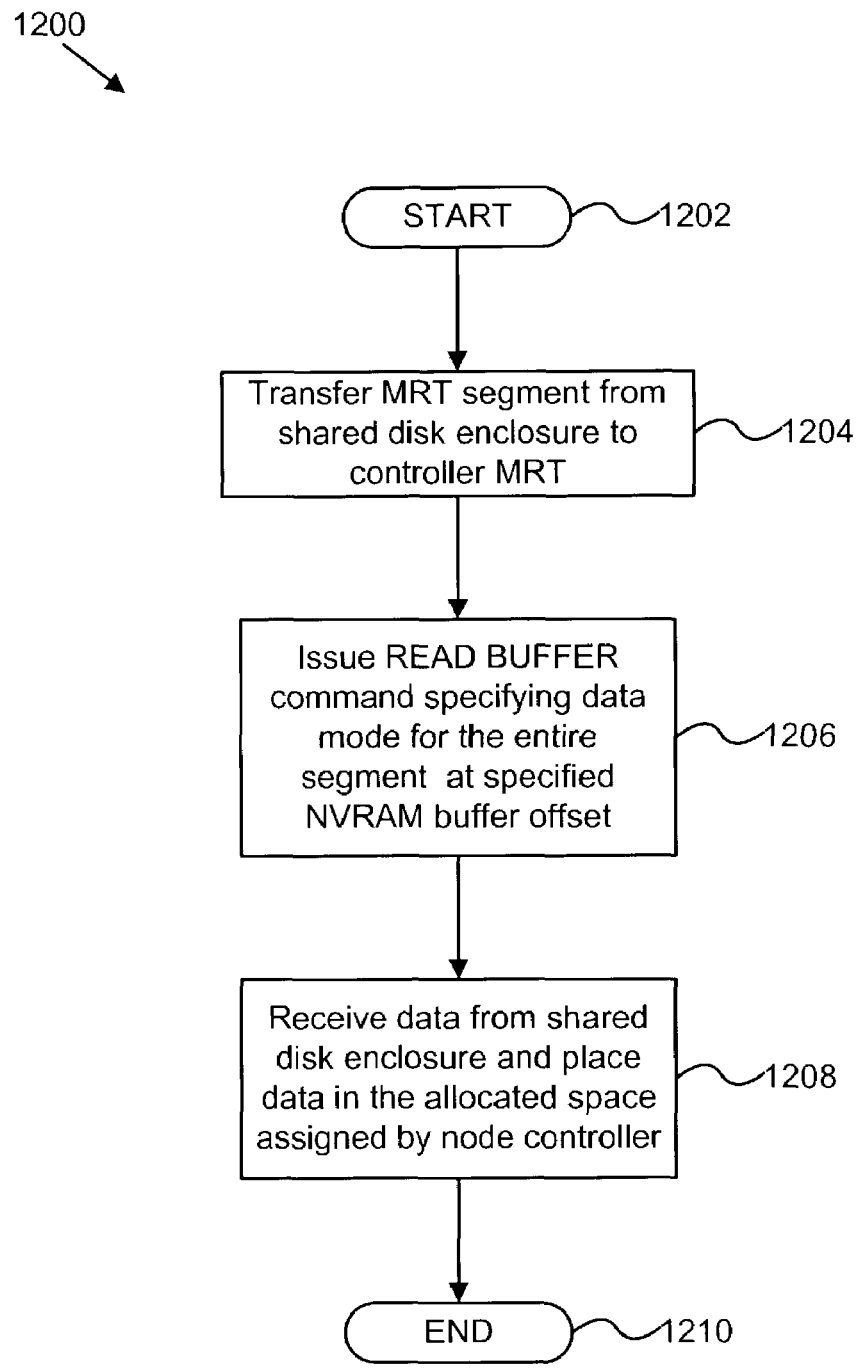
FIG. 12 is a flow chart illustrating a method for transferring an MRT segment from the SAF-TE enclosure of the present invention.

Referring now to FIG. 12, shown therein is a flow chart illustrating a method 1200 for transferring an MRT segment from the shared disk enclosure of the present invention. The method 1200 illustrates one specific embodiment of the step of retrieving 902 the shared disk enclosure MRT of FIG. 9. The method 1200 starts 1202, and an MRT segment is transferred 1204 from the shared disk enclosure MRT to the node controller MRT. Under an embodiment of the present invention, a READ BUFFER command is then issued 1206 specifying data mode for the entire segment at the predetermined NVRAM buffer offset. Data is then received 1208 from the shared disk enclosure, and the data is placed in the allocated space assigned by the node controller.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for reliable failover capabilities, the apparatus comprising:
   a plurality of RAID controllers configured to access a plurality of shared disks;
   a mirror race table (MRT) comprising a plurality of write operation entries indexed by logical drive number, wherein each write operation entry includes a valid flag and a logical block address (LBA); and
   a common MRT storage location accessible by each of the RAID controllers.

2. The apparatus of claim 1, wherein the common MRT storage location comprises a non-volatile random access memory (NVRAM) module.

3. The apparatus of claim 1, further comprising a shared disk enclosure comprising a SCSI accessed fault-tolerant enclosure (SAF-TE).

4. The apparatus of claim 1, further comprising an MRT search module configured to search the MRT for the first free entry.

5. The apparatus of claim 4, wherein the MRT search module is configured to search from the top to the bottom of the MRT.

6. The apparatus of claim 1, further comprising an MRT entry module configured to create an entry in the MRT by entering a logical block address (LBA) of a first cache line group to be written to the plurality of shared disks.

7. The apparatus of claim 1, further comprising an MRT pointer module configured to save an MRT pointer for the entry.

8. The apparatus of claim 1, further comprising an MRT retrieve module configured to find and retrieve the MRT pointer for the entry.

9. The apparatus of claim 1, further comprising an MRT read module configured to locate the cache line group of data on disks for consistency restoration after a node bootup or cluster failover.

10. The apparatus of claim 1, further comprising an MRT clear module configured to find and clear the entry from the MRT.

11. The apparatus of claim 1, further comprising an MRT transfer module configured to transfer the MRT from the shared disk enclosure to at least one RAID controller.

12. A method for reliable failover capabilities, the method comprising:
    accessing a plurality of shared disks with a plurality of RAID controllers;
    updating a mirror race table (MRT) comprising a plurality of write operation entries indexed by logical drive number, wherein each write operation entry includes a valid flag and a LBA; and
    providing a common MRT storage location accessible by each of the RAID controllers.

13. The method of claim 12, wherein establishing a common MRT storage location further comprises establishing a common MRT storage location within a shared disk enclosure.

14. The method of claim 12, further comprising:
    accessing the MRT;
    updating the MRT from the common MRT storage location;
    detecting a failure of at least one RAID controller; and
    reliably distributing the work load of the failed RAID controller.

15. The method of claim 12, further comprising providing a shared disk enclosure comprising a SCSI accessed fault-tolerant enclosure (SAF-TE).

16. The method of claim 12, further comprising searching the MRT for a first free entry.

17. The method of claim 14, further comprising searching the MRT from the top to the bottom of the MRT.

18. The method of claim 12, further comprising creating an entry in the MRT by entering the logical block address (LBA) of the first cache line group to be written to the plurality of shared disks.

19. The method of claim 12, further comprising saving an MRT pointer for the entry.

20. The method of claim 12, further comprising finding and retrieving the MRT pointer for the entry.

21. The method of claim 12, further comprising reading the MRT entry to locate data for consistency restoration when necessary.

22. The method of claim 12, further comprising finding and clearing the entry from the MRT.

23. The method of claim 12, further comprising transferring the MRT from a shared disk enclosure to at least one RAID controller.

24. A method for reliable failover capabilities, the method comprising:
    providing a plurality of shared disks;
    providing a plurality of RAID controllers;
    providing a mirror race table (MRT) comprising a plurality of write operation entries indexed by logical drive number, wherein each write operation entry includes a valid flag and a LBA and each write operation entry is cleared in response to a completed write operation;
    establishing a common MRT storage location accessible by each of the RAID controllers;
    accessing the MRT;
    updating the MRT;
    detecting a failure of at least one RAID controller;
    distributing a work load of the failed RAID controller;
    searching the MRT for a first free entry;
    creating an entry in the MRT by entering a logical block address (LBA) of a first cache line group to be written to the plurality of shared disks;
    saving an MRT pointer for the entry;
    finding and retrieving the MRT pointer for the entry;
    reading the MRT entry to locate data to be made consistent;
    finding and clearing the entry from the MRT;
    transferring the MRT from a shared disk enclosure to at least one RAID controller; and
    performing uncompleted write operations.

25. A system for reliable failover capabilities, the system comprising:
    a plurality of shared disks;
    a plurality of RAID controllers;
    a mirror race table (MRT) comprising a plurality of write operation entries indexed by logical drive number, wherein each write operation entry includes a valid flag and a LBA and each write operation entry is cleared in response to a completed write operation; and
    a common MRT storage location accessible by each of the RAID controllers, the common MRT storage location comprising a non-volatile random access memory (NVRAM) module.

26. An apparatus for reliable failover capabilities, the apparatus comprising:
    means far accessing a plurality of shared disks with a plurality of RAID controllers;
    means for updating a mirror race table (MRT) comprising a plurality of write operation entries indexed by logical drive number, wherein each write operation entry includes a valid flag and a LBA and each write operation entry is cleared in response to a completed write operation;
    means for accessing the MRT; and
    means for storing a common MRT such that the common MRT is accessible by each of the RAID controllers.

* * * * *